United States Patent
Suzuki et al.

(10) Patent No.: US 10,143,923 B2
(45) Date of Patent: Dec. 4, 2018

(54) ELECTRONIC GAME-PROVIDING DEVICE, ELECTRONIC GAME DEVICE, ELECTRONIC GAME-PROVIDING PROGRAM, AND ELECTRONIC GAME PROGRAM

(71) Applicant: DeNa Co., Ltd., Tokyo (JP)

(72) Inventors: Toshinori Suzuki, Tokyo (JP); Makoto Yamaguchi, Tokyo (JP); Masatoshi Inagawa, Tokyo (JP); Yoshiro Kitazawa, Tokyo (JP)

(73) Assignee: DENA CO., LTD., Tokyo (JP)

( * ) Notice: Subject to any disclaimer, the term of this patent is extended or adjusted under 35 U.S.C. 154(b) by 189 days.

(21) Appl. No.: 15/030,669

(22) PCT Filed: Sep. 25, 2014

(86) PCT No.: PCT/JP2014/075447
§ 371 (c)(1),
(2) Date: Apr. 20, 2016

(87) PCT Pub. No.: WO2015/060061
PCT Pub. Date: Apr. 30, 2015

(65) Prior Publication Data
US 2016/0250551 A1    Sep. 1, 2016

(30) Foreign Application Priority Data
Oct. 22, 2013  (JP) ................................ 2013-219231

(51) Int. Cl.
*A63F 13/497*  (2014.01)
*A63F 13/35*   (2014.01)
*A63F 13/795*  (2014.01)

(52) U.S. Cl.
CPC ............ *A63F 13/497* (2014.09); *A63F 13/35* (2014.09); *A63F 13/795* (2014.09)

(58) Field of Classification Search
CPC ....... A63F 13/35; A63F 13/497; A63F 13/795
(Continued)

(56) References Cited

U.S. PATENT DOCUMENTS 7,377,852 B2    5/2008  Nagashima
2002/0082088 A1 6/2002  Nagashima
(Continued)

FOREIGN PATENT DOCUMENTS

CN    1309366 A     8/2001
JP    2002-248276   9/2002
(Continued)

OTHER PUBLICATIONS

Office Action for Korean Patent Application No. KR 10-2016-7011511 dated Aug. 2, 2017. 7 pages.
(Continued)

*Primary Examiner* — Michael Cuff
(74) *Attorney, Agent, or Firm* — Procopio, Cory, Hargreaves & Savitch LLP

(57) ABSTRACT

An electronic game-providing device is provided that stores log information relating to electronic game play conducted by an invitor user in association with link information used to access said log information, in the form of a game play database; transmits invitation information containing the link information to an invitee user; and, upon receipt of a link information selection from the invitee user, refers to the game play database and transmits the log information associated with the selected link information.

6 Claims, 4 Drawing Sheets

(58) Field of Classification Search
USPC .................................................. 463/43, 24
See application file for complete search history.

(56) References Cited

U.S. PATENT DOCUMENTS

| | | | | |
|---|---|---|---|---|
| 2010/0306813 | A1* | 12/2010 | Perry .................. | A63F 13/10 |
| | | | | 725/114 |
| 2013/0005481 | A1 | 1/2013 | Tagawa et al. | |
| 2013/0172086 | A1 | 7/2013 | Ikenaga | |
| 2013/0252728 | A1 | 9/2013 | Kaneyoshi et al. | |
| 2014/0004955 | A1* | 1/2014 | Nahari ................. | A63F 13/12 |
| | | | | 463/42 |
| 2014/0274358 | A1* | 9/2014 | Hoskins ............... | A63F 13/25 |
| | | | | 463/29 |
| 2014/0349754 | A1 | 11/2014 | Kaneoka et al. | |
| 2016/0184712 | A1* | 6/2016 | Colenbrander ....... | A63F 13/79 |
| | | | | 463/29 |
| 2017/0282079 | A1* | 10/2017 | De La Cruz ......... | A63F 13/537 |

FOREIGN PATENT DOCUMENTS

| | | |
|---|---|---|
| JP | 2008-188051 | 8/2008 |
| JP | 2011-101775 | 5/2011 |
| JP | 2012-065831 | 4/2012 |
| JP | 2013-009818 | 1/2013 |
| JP | 2013009818 A | 1/2013 |
| JP | 2013-081760 | 5/2013 |
| JP | 2013-178752 | 9/2013 |
| JP | 2013-178752 A | 9/2013 |
| JP | 2013081760 A | 9/2013 |
| WO | 2012/039211 | 3/2012 |
| WO | 2013001897 | 1/2013 |
| WO | 2013/047166 | 4/2013 |
| WO | 2013/111249 A1 | 8/2013 |
| WO | 2013/118597 | 8/2013 |

OTHER PUBLICATIONS

Office Action for Japanese Patent Application No. 2014-078704 dated Oct. 24, 2017; 10 pages. English translation provided.
International Search Report for PCT App No. PCT/JP2014/075447 dated Nov. 4, 2014, 7 pgs.
Office Action in related Chinese Patent Application No. 2014800514111 dated Aug. 20, 2018; English translation provided; 12 pages.

* cited by examiner

| User ID | Game Play Data ID | Playback URL | Game URL |
|---|---|---|---|
| a0001 | a0001_001 | http://··· | http://··· |
| a0001 | a0001_002 | http://··· | http://··· |
| a0001 | a0001_003 | http://··· | http://··· |
| a0001 | a0001_004 | http://··· | http://··· |
| a0002 | a0002_001 | http://··· | http://··· |
| a0003 | a0003_001 | http://··· | http://··· |

ELECTRONIC GAME-PROVIDING DEVICE, ELECTRONIC GAME DEVICE, ELECTRONIC GAME-PROVIDING PROGRAM, AND ELECTRONIC GAME PROGRAM

This a National Stage Entry of PCT/JP2014/75447, filed on Sep. 25, 2014, claiming priority to Japanese Patent Application No. 2013-219231, filed on Oct. 22, 2013, the contents of which is incorporated herein by reference in its entirely.

TECHNICAL FIELD

The present invention relates to an electronic game-providing device, an electronic game device, an electronic game-providing program (e.g., non-transitory computer-readable medium including instructions stored in a storage and a processor), and an electronic game program (e.g., non-transitory computer-readable medium including instructions stored in a storage and a processor).

BACKGROUND ART

Technology has been disclosed in which a first user registered with a game service issues a registration invitation to a second user not yet registered with the game service, and benefits are provided to the inviting first user when the invited second user is newly registered (Patent Document 1).

PRIOR ART DOCUMENTS

Patent Documents

Patent Document 1: Japanese Patent Application 2012-195415

SUMMARY OF THE INVENTION

Problems to be Solved by the Invention

Incidentally, if the invited user did not acquaint himself with instructions on how to play the game and other tutorials, etc. upon registration with the game service, there was a risk that he might be unable to enjoy the game and be unable to progress to a point where the game could be actually enjoyable. In addition, it was difficult to determine whether the game was to one's liking before one started to actually play the game.

It is an object of the present invention to provide an electronic game-providing device, an electronic game device, an electronic game-providing program, and an electronic game program that make it possible for users invited to join a game to be smoothly introduced to the game.

Means for Solving the Problems

One aspect of the present invention relates to an electronic game-providing device provided with: log information storage means for storing log information used for the playback of electronic game play conducted on an invitor user's information terminal in association with link information used to access said log information, in the form of a game play database; invitation information transmitting means for transmitting invitation information containing the link information to an invitee user's information terminal; and log information transmitting means which, upon receipt of a link information selection from the invitee user's information terminal, refers to the game play database and transmits the log information associated with the selected link information to the invitee user's information terminal.

Another aspect of the present invention relates to an electronic game-providing program that directs a computer to operate as: log information storage means for storing log information used for the playback of electronic game play conducted on an invitor user's information terminal in association with link information used to access said log information, in the form of a game play database; invitation information transmitting means for transmitting invitation information containing the link information to an invitee user's information terminal; and log information transmitting means which, upon receipt of a link information selection from the invitee user's information terminal, refers to the game play database and transmits the log information associated with the selected link information to the invitee user's information terminal.

In this invention, the invitation information transmitting means preferably transmits the invitation information to the information terminal of the invitee user specified by the invitor user's information terminal.

It is also preferably provided with user registration determination means for determining whether the invitee user is a registered user or a new user based on the information transmitted from the invitee user's information terminal, and user registration means for carrying out user registration processing for the invitee user if the user registration determination means determines that the invitee user is a new user.

It is also preferable that the log information contains information allowing for the electronic game to be played on the invitee user's information terminal starting from the game play state reached on the invitor user's information terminal.

Another aspect of the present invention relates to an electronic game device provided with: invitation information receiving means which, as a result of accessing an electronic game-providing device provided with log information storage means for storing log information used for the playback of electronic game play conducted on an invitor user's information terminal in association with link information used to access said log information, in the form of a game play database; invitation information transmitting means for transmitting invitation information containing the link information to an invitee user's information terminal; and log information transmitting means which, upon receipt of a link information selection from the invitee user's information terminal, refers to the game play database and transmits the log information associated with the selected link information to the invitee user's information terminal, receives invitation information containing link information inviting to the game from said invitation information transmitting means; log information receiving means which, as a result of selecting the link information and transmitting it to the invitation information transmitting means, receives the log information associated with the selected link information from the log information transmitting means; and game recreating means for recreating electronic game history based on the log information.

Another aspect of the present invention relates to an electronic game program which, as a result of accessing an electronic game-providing device provided with log information storage means for storing log information used for the playback of electronic game play conducted on an invitor user's information terminal in association with link information used to access said log information, in the form of a game play database; invitation information transmitting means for transmitting invitation information containing the link information to an invitee user's information terminal; and log information transmitting means which, upon receipt of a link information selection from the invitee user's information terminal, refers to the game play database and transmits the log information associated with the selected link information to the invitee user's information terminal, directs a computer to operate as invitation information receiving means for receiving invitation information containing link information inviting to the game from said invitation information transmitting means; log information receiving means which, as a result of selecting the link information and transmitting it to the invitation information transmitting means, receives the log information associated with the selected link information from the log information transmitting means; and game recreating means for recreating electronic game history based on the log information.

In this invention, there is preferably provided game executing means which, based on the log information, allows the invitee user to play the electronic game starting from the game play state reached by the invitor user.

Effects of the Invention

In accordance with the present invention, a user who has received an invitation from another user can be smoothly introduced to the game.

BEST MODE FOR CARRYING OUT THE INVENTION

Figure 1:
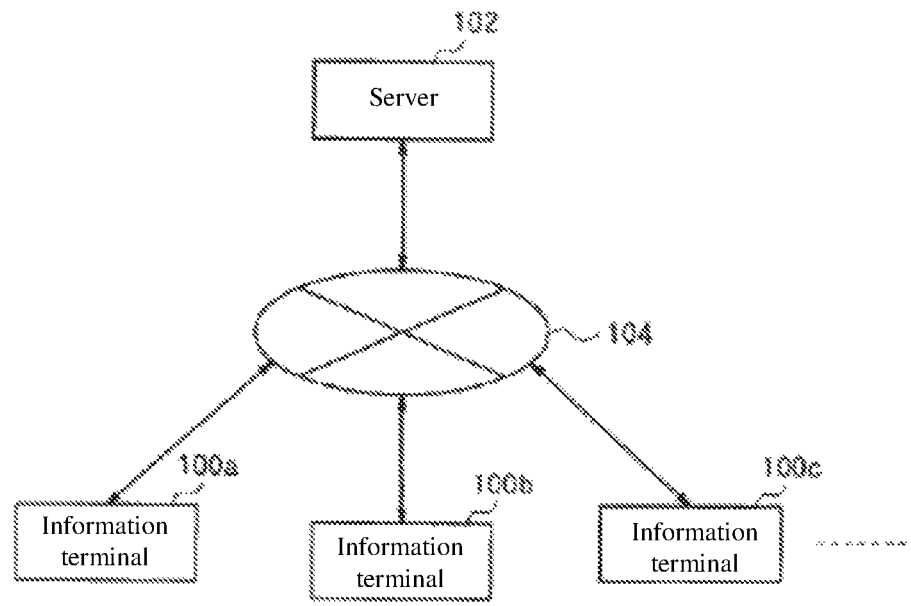
FIG. 1 A diagram illustrating the configuration of an electronic game system in an embodiment of the present invention.

As shown in FIG. 1, an electronic game system used in an embodiment of the present invention includes information terminals 100 and a server 102. The server 102 is communicatively connected to multiple information terminals 100 (100a, 100b . . . ) via an information communication network 104. The server 102 provides information allowing for an electronic game to be played on the information terminals 100.

Figure 2:
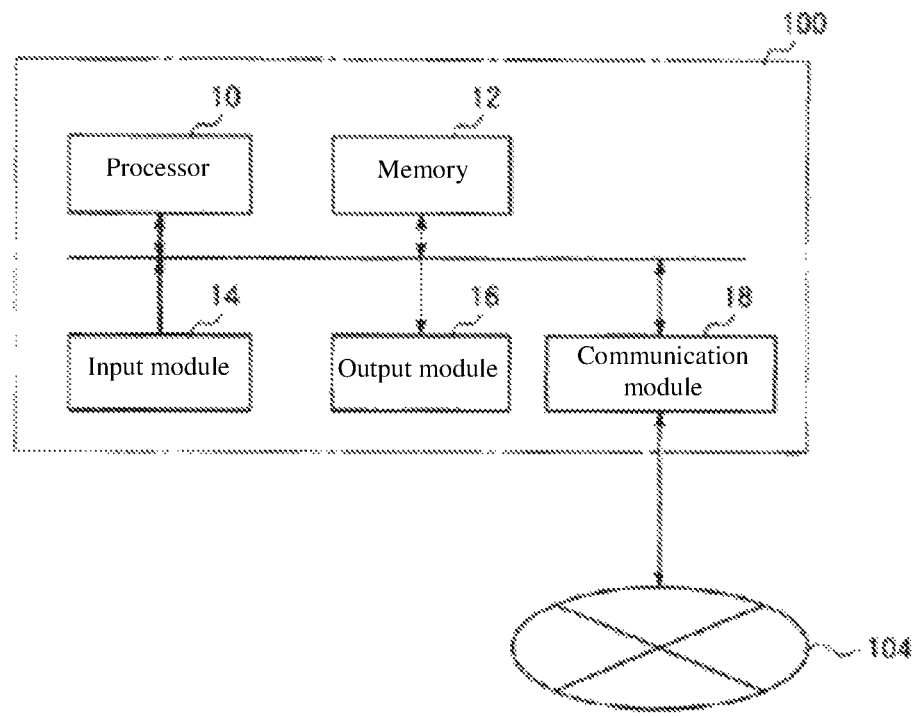
FIG. 2 A diagram illustrating the configuration of an information terminal in an embodiment of the present invention.

As shown in FIG. 2, an information terminal 100 includes a processor 10, a memory 12, an input module 14, an output module 16, and a communication module 18. The basic configuration of the information terminals 100 is that of a communication-enabled mobile terminal, such as a mobile phone, a smartphone, a tablet terminal, or the like. In this embodiment, the information terminals 100 operate as electronic game devices.

The processor 10 includes means for performing arithmetic processing, such as a CPU. The processor 10 implements the functions that may be used on the information terminals 100 by running mobile terminal software stored in the memory 12. The memory 12 includes storage means, such as a semiconductor memory, a memory card, or the like. The memory 12 is accessibly connected to the processor 10 and stores electronic game software, data required for electronic game processing, as well as databases and other information. The input module 14 includes means for entering information into the information terminals 100. The input module 14 has, for example, a touchscreen panel, buttons, or the like for receiving input from the user. The output module 16 includes, for example, a user interface screen (UI) for accepting input information from the user and means for outputting the results of processing by the information terminals 100. The output module 16 is provided with a display that, for example, presents images to the user. The communication module 18 includes an interface for exchanging information with other information communication devices via the information communication network 104. The communication module 18 may be wired or wireless.

Figures 3, 4:
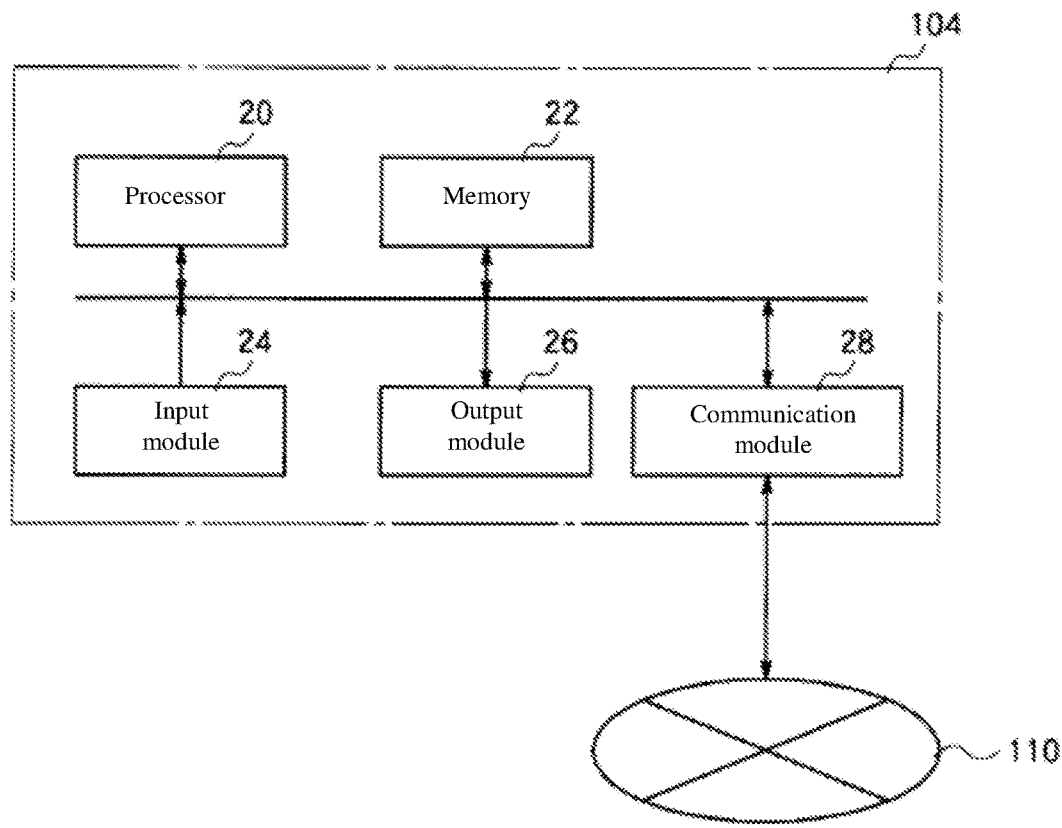
FIG. 3 A diagram illustrating the configuration of a server in an embodiment of the present invention.
FIG. 4 A diagram illustrating an example of registration in a game play database in an embodiment of the present invention.

As shown in FIG. 3, the server 102 includes a processor 20, a memory 22, an input module 24, an output module 26, and a communication module 28. The basic configuration of the server 102 is that of a computer with communication capabilities. In this embodiment, the server 102 operates as an electronic game-providing device.

The processor 20 includes means for performing arithmetic processing, such as a CPU. The processor 20 controls the functions that may be used on the information terminals 100 by executing a server program (e.g., non-transitory computer-readable medium including instructions stored in a storage and a processor) stored in the memory 22. The memory 22 includes storage means, such as a semiconductor memory, a hard disk, or the like. The memory 22 is accessibly connected to the processor 20 and stores an electronic game-providing program (e.g., non-transitory computer-readable medium including instructions stored in a storage and a processor), data used in an electronic game acquired from the information terminals 100, as well as databases and other information. The input module 24 includes means for entering information into the server 102. The input module 24 has, for example, a keyboard, for receiving input from the user. The output module 26 includes, for example, a user interface screen (UI) for accepting input information from the user, and means for outputting the results of processing by the server 102. The output module 26 is provided with a display that, for example, presents images to the user. The communication module 28 includes an interface for exchanging information with the information terminals 100 and other information communication devices via the information communication network 104. The communication module 28 may be wired or wireless.

In the present embodiment, it is assumed that the information terminal 100a belongs to User A and the information terminal 100b belongs to User B. In addition, it is assumed that User A has been registered with the electronic game service provided by the server 102 using the information terminal 100a and is playing the electronic game provided by said service. On the other hand, it is assumed that User B has not been registered with the electronic game service provided by the server 102 and cannot play the electronic game provided by said service.

In addition, in this embodiment, it is assumed that the electronic game program (e.g., non-transitory computer-readable medium including instructions stored in a storage and a processor) running on the information terminals 100 includes a function for acquiring information about the electronic game played by the user and uploading it to the server 102. For every user, the server 102 registers electronic game-related information (log information) uploaded from the information terminals 100 in the game play database of the memory 22.

The electronic game-related information (log information) may be represented by photographs and videos having recorded therein images appearing during the playing of an electronic game or an input log created by a player during an electronic game. In addition, the uploading of the electronic game-related information may be performed either automatically or by instruction from a player of the electronic game.

As shown in the example of registration in FIG. 4, the game play database has stored therein user IDs in association with game play data IDs, playback URLs, and game URLs. The game play database is stored in the memory 22 of the server 102.

A user ID is an identifier identifying a user who has been registered with the electronic game service provided by the server 102. User IDs are unique identifiers assigned to every user.

The game play data IDs are identifiers used for reading out the parameters and data used to run the electronic game played by the users identified by the associated user IDs. The parameters and data used when providing an electronic game in communication with the information terminals 100 are registered in the memory 22 of the server 102 in association with the game play data IDs. When a game play data ID is specified, the server 102 reads out the parameters and data associated with said game play data ID and runs the electronic game based on this information.

It should be noted that the specific processes used in the electronic game are not a feature of the invention of this Application, and specific discussion thereof has been omitted.

A playback URL represents link information used to view the history of a first user's performance in the electronic game when the first user identified by the associated user ID invites a second user to the electronic game service. Records (still pictures, videos, and log information, such as input logs) obtained when the first user plays the electronic game as a player and registers a game play data ID are stored in the memory 22 of the server 102 in association with a playback URL. As a result of accessing the playback URL, the log information associated with the playback URL is read out, and an electronic game play can be recreated based on said log information.

A game URL is a URL used to invite other users to the electronic game system. A game URL represents link information that is used to initiate the electronic game from a stage determined by the electronic game play results of the invitor user when the corresponding selection is made by another user who has been invited. Log information used to restart the electronic game from the state corresponding to the time when the user identified by the associated user ID registered the game play data ID is stored in the memory 22 of the server 102 in association with a game URL. As a result of accessing the game URL, the information associated with the game URL is read out, and the game can be initiated from the state reached by the user identified by the associated user ID.

It should be noted that the same user may register a plurality of game play data IDs, playback URLs, and game URLs. In the example of FIG. 4, the user with the user ID of a0001 has registered four sets of game play data IDs, playback URLs, and game URLs.

In addition, registration in the game play database may be performed after the user finishes playing the electronic game. In addition, registration may be accomplished by instruction from the user while the user is in the process of playing the electronic game.

Figure 5:
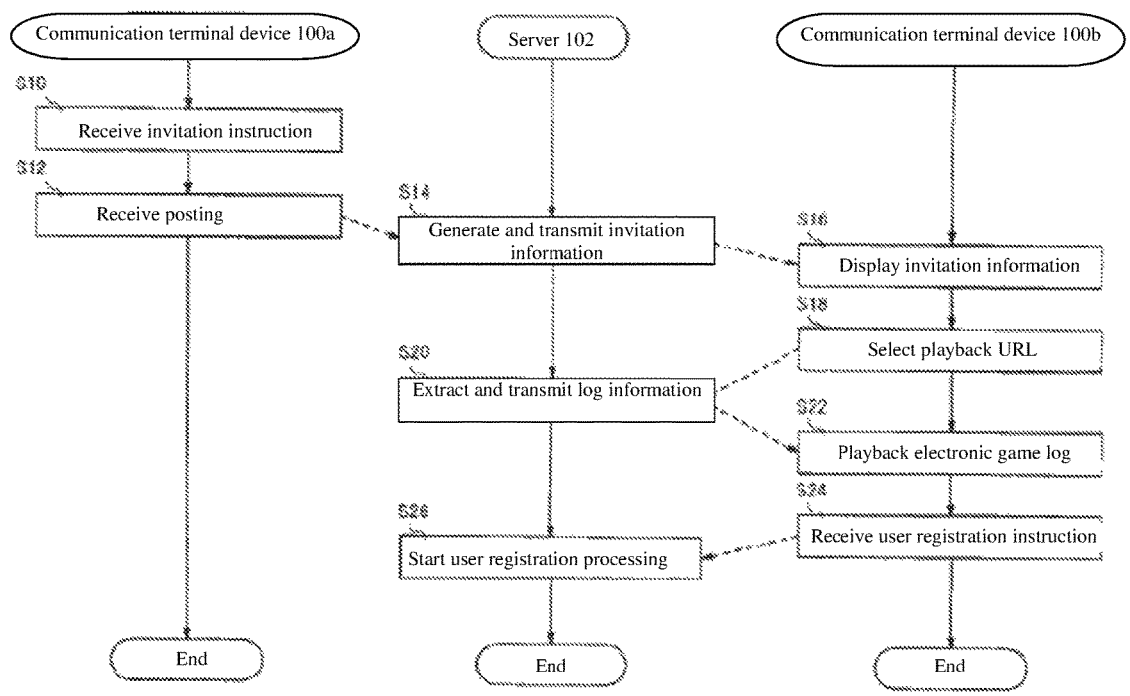
FIG. 5 A flow chart of an invitation process in an embodiment of the present invention.

The process of issuing an invitation to join the electronic game system in this embodiment is illustrated below with reference to the flowchart of FIG. 5. The discussion below will describe an example in which an invitation to join the electronic game system is sent via the server 102 from User A, who is using information terminal 100a, to User B, who is using information terminal 100b. It should be noted that by going through the following processes, the information terminals 100a, 100b and the server 102 operate as means for performing the respective processes.

In Step S10, an instruction to invite another user to the electronic game service is accepted by the information terminal 100a. The process performed in this step corresponds to an invitation instruction acceptance means. A selection module used to invite other users to the electronic game service is displayed by the output module 16 of the information terminal 100a while User A (i.e., the first user) is playing the electronic game, or after the game play is over. The process of issuing an invitation to another user is initiated when User A selects (taps, if this is a touchscreen panel) the on-screen selection module.

In Step S12, a message is posted to a messaging tool or a social networking service (hereinafter, SNS) via the information terminal 100a. The process performed in this step corresponds to a message posting acceptance means. The information terminal 100a displays an interface screen that facilitates posting messages to a messaging tool or SNS in order to send other users invitations to the electronic game system. User A then identifies another user to be invited to the electronic game system (User B). For example, User A enters SNS access information or a destination address for a message to User B, who is the invitee. The information terminal 100a transmits a user ID for User A, who is the referring user, and access information for User B, who is identified as the invitee, to the server 102.

It should be noted that messages may be posted to a messaging tool or SNS without identifying users. That is, the invitor user's posting may be transmitted to a messaging tool or SNS server and disclosed to many users, such as the originating user's friends or other SNS users, etc. Subsequently, when the users access the messaging tool or SNS server, the posting is displayed on the information terminals 100 of the users.

It should be noted that a setup may be used in which an inputted message from an invitor user to an invitee user is accepted and the message is transmitted to the server 102.

In addition, upon initiation of the invitation process, information (hypertext, etc.) about the interface to facilitate the posting of messages to the messaging tool or SNS in order to invite other users to the electronic game system may be transmitted from the server 102 to the information terminal 100a, and messages may be posted using said interface on the information terminal 100a.

In Step S14, an invitation is sent to the user who has been designated as the invitee. The process performed in this step corresponds to an invitation information transmitting means. After receiving the invitor User A's user ID and the invitee User B's access information from the information terminal 100a, the server 102 transmits invitation information to User B's information terminal 100b. The server 102 refers to the game play database stored in the memory 22, reads out the playback URL and game URL associated with the invitor User A's user ID, and transmits the acquired playback URL and game URL, along with the invitation information (hypertext, etc.), to the information terminal 100b.

In addition, when a message is posted to a messaging tool or SNS without identifying users, the posted message includes the playback URL and game URL associated with the invitor User A's user ID. The server 102 transmits the message posting information containing the playback URL and game URL to the server providing the SNS or messaging tool service. Accordingly, the other user may receive the invitation from User A by accessing the messaging tool or SNS.

If there is a message from the invitor user to the invitee user at such time, said message may be transmitted along with the invitation information.

In addition, if there are multiple sets of playback URLs and game URLs registered for the invitor user, all the information items may be transmitted along with the invitation information. In addition, the originating user may be allowed to specify which of the playback URLs and game URLs are to be used.

In Step S16, the invitation information is displayed on the information terminal 100b belonging to User B who has been designated as the invitee. This step corresponds to an invitation information receiving means and an invitation information displaying means. User B's information terminal 100b receives the invitation information from the server 102 and displays information used to invite User B to the electronic game system on the output module 16 of the information terminal 100b. The displayed screen preferably includes hyperlinks to the playback URL and game URL.

In Step S18, an instruction to view an electronic game play is received from User B. The process performed in this step corresponds to a viewing instruction acceptance means. If User B, who has received an invitation from User A, thinks that he would like to know what kind of electronic game this is prior to registration with the electronic game system, User B specifies a playback URL (hyperlink). Once a playback URL has been specified, the information terminal 100b transmits a request to playback User A's game play data to the server 102.

In Step S20, the log information used for the playback of electronic game play is transmitted to the information terminal 100b. The process performed in this step corresponds to a log information transmitting means. Upon receiving the playback URL specified by User B, the server 102 reads out the log information registered in the memory 22 in association with the playback URL and transmits it to the information terminal 100b. Further, in addition to the log information, a registration URL (preferably a hyperlink) to allow for registration with the electronic game service once the log information playback has finished is transmitted to the information terminal 100b.

In Step S22, the electronic game play is played back based on the log information. The process performed in this step corresponds to a log information receiving means and a game recreating means. Upon receiving the log information from the server 102, the information terminal 100b recreates the electronic game play on the information terminal 100b based on the log information. If the log information is a video, video data stored in the memory 22 of the server 102 may be recreated on the information terminal 100b. In addition, if the log information is an input log, the game may be automatically executed on the information terminal 100b based on the input log.

For example, if information recreating a situation in which User A skillfully completing the electronic game is registered as log information, User B can use the recreated screens to learn how to successfully complete the electronic game. Alternatively, if information recreating a situation in which User A suffered an amusing defeat in the electronic game is registered as the log information, User B can appreciate the entertainment value of the defeat in the electronic game.

In this manner, game play situations from the electronic game are recreated and presented to User B, who has been designated as the invitee, thereby stimulating communication between User A and User B. Furthermore, this can lower User B's psychological barrier to registering with the electronic game service and can help smoothly introduce User B to the electronic game. In addition, User B can determine whether or not the electronic game provided by the electronic game service to which he is invited is interesting prior to user registration with the electronic game service.

In Step S24, an instruction to perform user registration is received from the invitee user. The process performed in this step corresponds to a user registration instruction acceptance means. Once the playback of the log information on the information terminal 100b is finished, a registration URL (hyperlink) is displayed on the output module 16 of the information terminal 100b. When registering with the electronic game service, User B selects the displayed registration URL. If the registration URL is selected, the information terminal 100b transmits the registration URL to the server 102.

In Step S26, the process of User B's registration with the electronic game service is initiated. This process corresponds to a user registration means. Upon receiving the registration URL from the information terminal 100b, the server 102 transmits information used for registration with the electronic game service to the information terminal 100b. The information used for registration may be, for example, the hypertext, etc. of the registration website.

At such time, the information sent from User B's information terminal 100b may be used to determine whether User B is a registered user who has already been registered with the electronic game service or a new user who has not been registered, and the user registration process may be performed only if it is determined that User B is a new user. This process corresponds to a user registration determination means.

As a result, User B can be registered as a new user of the electronic game service. It should be noted that the registration process uses existing methods and will not be discussed in further detail herein.

Once User B completes user registration with the electronic game service, a friend request, which is intended to build friendly relations within the electronic game service, may be sent to invitor User A. Alternatively, once User B completes user registration with the electronic game service, User B may be made friends with User A. These processes correspond to a friendly relation building means. As a result, User A can start the game in a state in which he has a friend, which makes it possible to increase User A's motivation to start the game.

<Variation 1>

In the above-described embodiment, it is assumed that the playback URL is indicated by User B and the log information of the electronic game is recreated. However, information about the invitation provided to User B is not limited to the above and it may involve making the invited User B actually play the electronic game.

Figure 6:
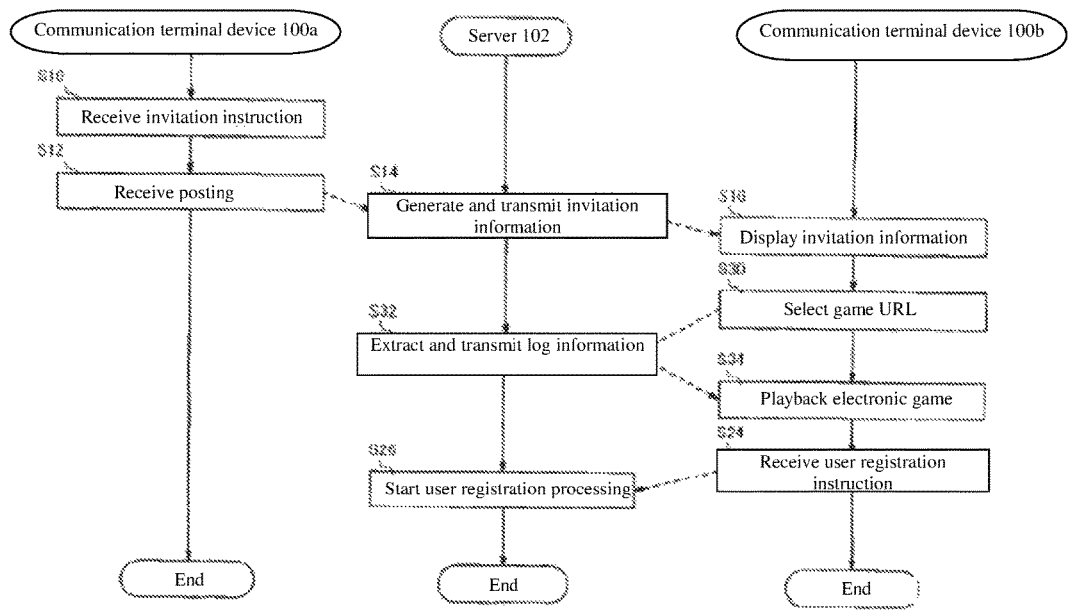
FIG. 6 A flow chart of an invitation process in an embodiment of the present invention.

The process of issuing an invitation to join the electronic game system in this variation is illustrated below, with reference to the flowchart of FIG. 6. The discussion below will describe an example in which an invitation to join the electronic game system is sent via the server 102 from User A, who is using information terminal 100*a*, to User B, who is using information terminal 100*b*. It should be noted that steps involving processes similar to those of the above-described embodiment are assigned the same reference numerals and will not be discussed further. In addition, by going through the following processes, the information terminals 100*a*, 100*b*, and the server 102 operate as means for performing the respective processes. It should be noted that the playback of User A's game play data may be performed after Step S16, and the process of Step S30 may be performed thereafter. In such a case, the playback of User A's game play data involves performing the same processes as in the above-described steps S18 through S20.

In Step S30, an instruction is received to play (as a trial) the electronic game. The process performed in this step corresponds to a game play instruction acceptance means. If User B, who has received an invitation from User A, thinks that he would like to try playing said electronic game prior to registration with the electronic game system, User B specifies a game URL (hyperlink). When the game URL is specified, the information terminal 100*b* transmits the game URL to the server 102.

In Step S32, the log information used to play the electronic game is transmitted to the information terminal 100*b*. The process performed in this step corresponds to a log information transmitting means. Upon receiving the game URL specified by User B, the server 102 reads out the log information used to restart the game, which is registered in the memory 22 in association with the game URL, and then transmits it to the information terminal 100*b*. If at such time there is an application, etc. required to run the electronic game on the information terminal 100*b*, it is transmitted as well. Further, in addition to the log information, a registration URL (preferably a hyperlink) to allow for registration with the electronic game service after playing the electronic game is transmitted to the information terminal 100*b*.

In Step S34, the electronic game is initiated based on the log information. The process performed in this step corresponds to a log information receiving means and a game executing means. Upon receiving the log information from the server 102, the information terminal 100*b* initiates the electronic game on the information terminal 100*b* based on the log information. At such time, an application required for playing the electronic game may be run if necessary.

For example, if log information is registered such that the electronic game is initiated from a situation immediately prior to User A completing a certain stage in the electronic game, User B can readily learn how to successfully complete the electronic game. In addition, the user can actually feel the joy of successfully completing the electronic game. Furthermore, if log information is registered such that the electronic game is restarted from a situation in which User A is engaged in a fight with a Raid Boss in the electronic game, or a situation, where he is playing a special stage, User B can experience the intrinsic entertaining value of this electronic game without undergoing painstaking procedures.

In this manner, communication between User A and User B is stimulated by allowing the invitee user to start playing from the situation in which the invitor user is playing the electronic game. Furthermore, this can lower User B's psychological barrier to registering with the electronic game service and can help smoothly introduce User B to the electronic game. In addition, User B can determine whether or not the electronic game provided by the electronic game service to which he is invited is interesting prior to user registration with the electronic game service.

It should be noted that the initiation of the electronic game and user registration may take place at the same time.

In addition, despite the fact that the above-described embodiment and variation involved management, etc. of the log information by the server 102, part or all of the processing performed by the server 102 may be performed by the information terminals 100*a* or 100*b*, or by other information terminals 100.

DESCRIPTION OF THE REFERENCE NUMERALS

10 Processor
12 Memory
14 Input module
16 Output module
18 Communication module
20 Processor
22 Memory
24 Input module
26 Output module
28 Communication module
100 (100*a*, 100*b*) Information terminals
102 Server
104 Information communication network

The invention claimed is:

1. An electronic game-providing device provided with:
    means for storing log information used for the playback of electronic game play conducted on an invitor user's information terminal from a game play state reached on the invitor user's information terminal in association with link information used to access said log information, in the form of a game play database;
    means for transmitting invitation information for user registration processing containing the link information to an invitee user's information terminal;
    means for log information transmitting which, upon receipt of a link information selection from the invitee user's information terminal, refers to the game play database and transmits the log information associated with the selected link information to the invitee user's information terminal, wherein the log information contains information allowing for the electronic game to be recreated on the invitee user's information terminal starting from the game play state reached on the invitor user's information terminal, the log information involving at least one of video or game play screens;
    means for determining whether an invitee user is a registered user or a new user based on the information transmitted from the invitee user's information terminal; and
    means for carrying out the user registration processing for the invitee user if the means for determining determines that the invitee user is a new user.

2. The electronic game-providing device according to claim 1,
    wherein the means for transmitting invitation information transmits the invitation information to the information terminal of the invitee user specified by the invitor user's information terminal.

3. The electronic game-providing device according to claim 1,
wherein the log information contains information allowing for the electronic game to be played on the invitee user's information terminal starting from the game play state reached on the invitor user's information terminal.

4. A non-transitory computer-readable medium containing instructions for a processor to perform:
storing log information used for the playback of electronic game play conducted on an invitor user's information terminal from a game play state reached on the invitor user's information terminal in association with link information used to access said log information, in the form of a game play database;
transmitting invitation information for user registration processing containing the link information to an invitee user's information terminal; and
log information transmitting which, upon receipt of a link information selection from the invitee user's information terminal, refers to the game play database and transmits the log information associated with the selected link information to the invitee user's information terminal, wherein the log information contains information allowing for the electronic game to be played on the invitee user's information terminal starting from the game play state reached on the invitor user's information terminal, the log information involving at least one of video or game play screens;
determining whether an invitee user is a registered user or a new user based on the information transmitted from the invitee user's information terminal; and
carrying out the user registration processing for the invitee user if the means for determining determines that the invitee user is a new user.

5. An electronic game device provided with:
means which, as a result of accessing an electronic game-providing device provided with
means for storing log information used for the playback of electronic game play conducted on an invitor user's information terminal from a game play state reached on the invitor user's information terminal in association with link information used to access said log information, in the form of a game play database;
means for transmitting invitation information for user registration processing containing the link information to an invitee user's information terminal; and
means for log information transmitting which, upon receipt of a link information selection from the invitee user's information terminal, refers to the game play database and transmits the log information associated with the selected link information to the invitee user's information terminal, receives invitation information containing link information inviting to the game from said means for transmitting invitation information;
means for log information receiving which, as a result of selecting the link information and transmitting it to the means for transmitting invitation information, receives the log information associated with the selected link information from the means for log information transmitting;
means for recreating electronic game history based on the log information;
means for determining whether an invitee user is a registered user or a new user based on the information transmitted from the invitee user's information terminal; and
means for carrying out the user registration processing for the invitee user if the means for determining determines that the invitee user is a new user;
wherein said electronic game device is provided with means for game executing which, based on the log information, allows the electronic game to be recreated on the invitee user's information terminal starting from the game play state reached on the invitor user's information terminal, the log information involving at least one of video or game play screens.

6. A non-transitory computer-readable medium containing instructions for a computer including the non-transitory computer-readable medium and a processor, wherein, as a result of accessing an electronic game-providing device, the instructions comprise:
means for storing log information used for the playback of electronic game play conducted on an invitor user's information terminal from a game play state reached on the invitor user's information terminal in association with link information used to access said log information, in the form of a game play database;
means for transmitting invitation information for user registration processing containing the link information to an invitee user's information terminal; and
means for log information transmitting which, upon receipt of a link information selection from the invitee user's information terminal, refers to the game play database and transmits the log information associated with the selected link information to the invitee user's information terminal, directs a computer to operate as means for receiving invitation information containing link information inviting to the game from said means for transmitting invitation information;
means for log information receiving which, as a result of selecting the link information and transmitting it to the means for transmitting invitation information, receives the log information associated with the selected link information from the means for log information transmitting;
means for recreating electronic game history based on the log information;
means for determining whether an invitee user is a registered user or a new user based on the information transmitted from the invitee user's information terminal;
means for carrying out the user registration processing for the invitee user if the means for determining determines that the invitee user is a new user; and
means for game executing which, based on the log information, allows the electronic game to be recreated on the invitee user's information terminal starting from the game play state reached on the invitor user's information terminal, the log information involving at least one of video or game play screens.

* * * * *